United States Patent [19]

Kramer, Jr.

[11] Patent Number: 5,435,962
[45] Date of Patent: Jul. 25, 1995

[54] RUBBER TUBING WITH AXIALLY SPACED ANNULARLY CORRUGATED FLEXIBLE SEGMENTS

[75] Inventor: Vance M. Kramer, Jr., Perrysburg, Ohio

[73] Assignee: Crushproof Tubing Company, McComb, Ohio

[21] Appl. No.: 248,097

[22] Filed: May 24, 1994

[51] Int. Cl.$^6$ .............................................. B29D 23/18
[52] U.S. Cl. .................................... 264/507; 264/508
[58] Field of Search ....... 264/506, 507, 508, DIG. 52; 425/387.1, 392, 532

[56] References Cited

U.S. PATENT DOCUMENTS

| 2,306,018 | 12/1942 | Fentress | 264/DIG. 52 |
| 2,347,101 | 4/1944 | Harding | 264/DIG. 52 |
| 2,616,129 | 11/1952 | Burton et al. | 264/507 |
| 3,304,581 | 2/1967 | Kramer et al. | 425/392 |
| 3,371,381 | 3/1968 | Louth | 264/507 |
| 3,669,586 | 6/1972 | Kramer | 425/532 |
| 3,975,129 | 8/1976 | Kramer, Sr. | 425/387.1 |

FOREIGN PATENT DOCUMENTS 652810 5/1951 United Kingdom ................ 264/507

Primary Examiner—Catherine Timm
Attorney, Agent, or Firm—Rankin, Hill, Lewis & Clark

[57] ABSTRACT

A process for making a length of rubber tubing with axially spaced circumferentially corrugated flexible segments from a sleeve of uncured rubber and the product resulting therefrom. An end length of a sleeve of uncured rubber is placed over an end portion of a forming mandrel and an external form is placed around the sleeve end length. Rudimentary corrugations are then formed in the end length after which the sleeve is moved axially along the forming mandrel so that a new length portion of the sleeve is placed in a forming position. Then using the external form, rudimentary corrugations are formed in the second length portion of the sleeve. These steps are repeated until the desired number of axial length portions in the sleeve are provided with rudimentary corrugations. The resulting product is then cured to form a length of rubber tubing with a plurality of axially spaced circumferentially corrugated flexible segments.

3 Claims, 4 Drawing Sheets

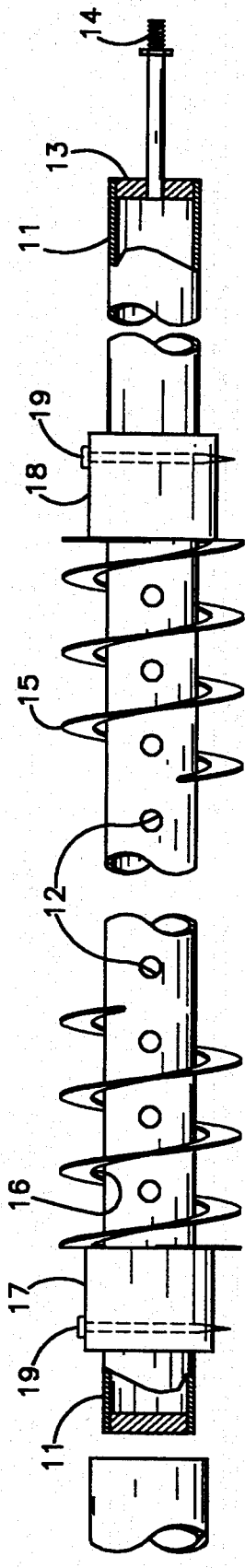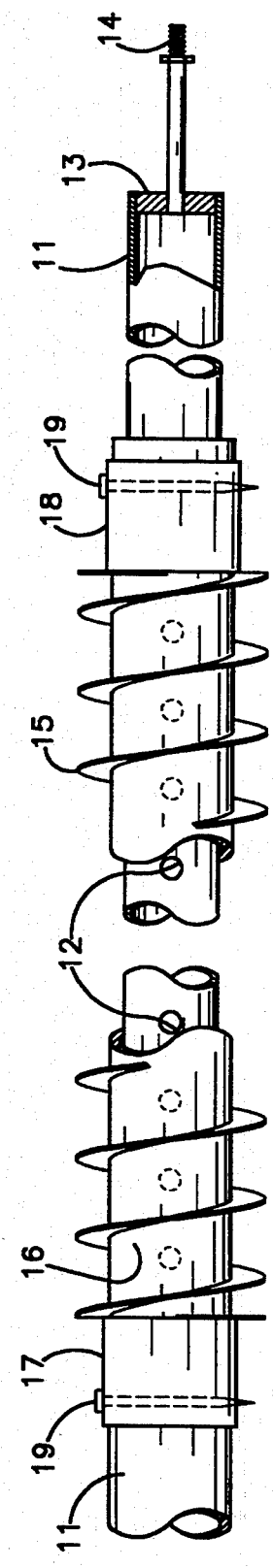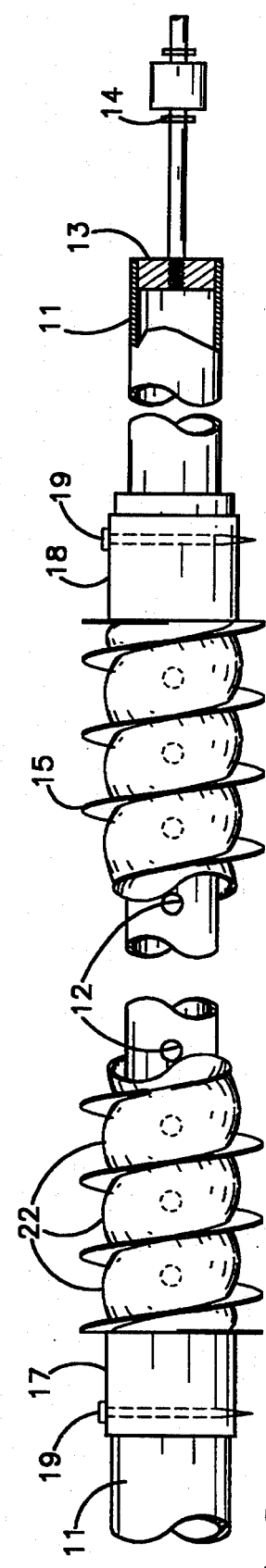

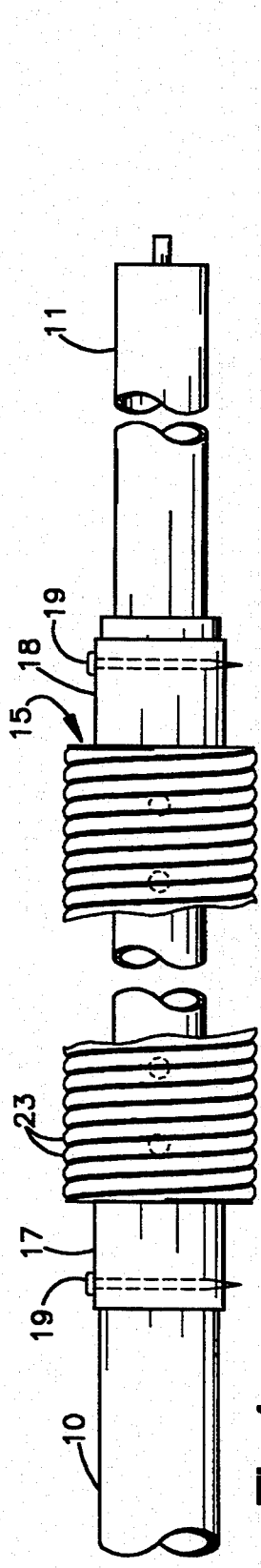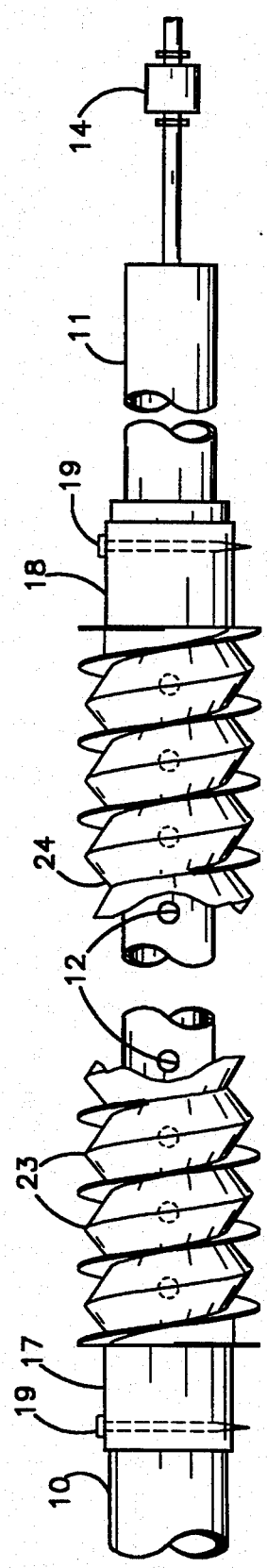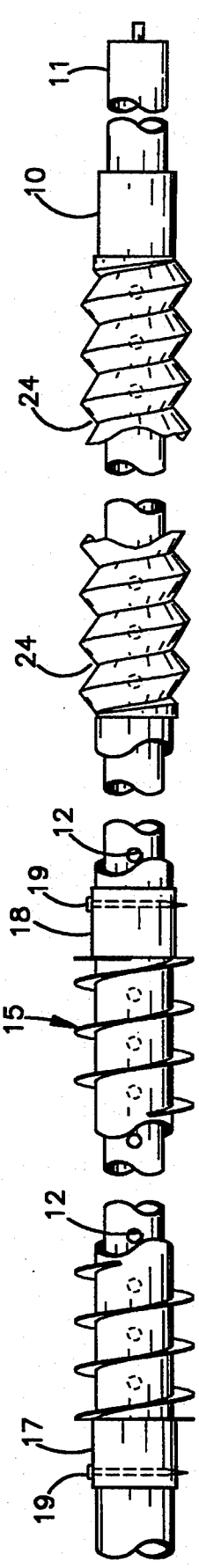

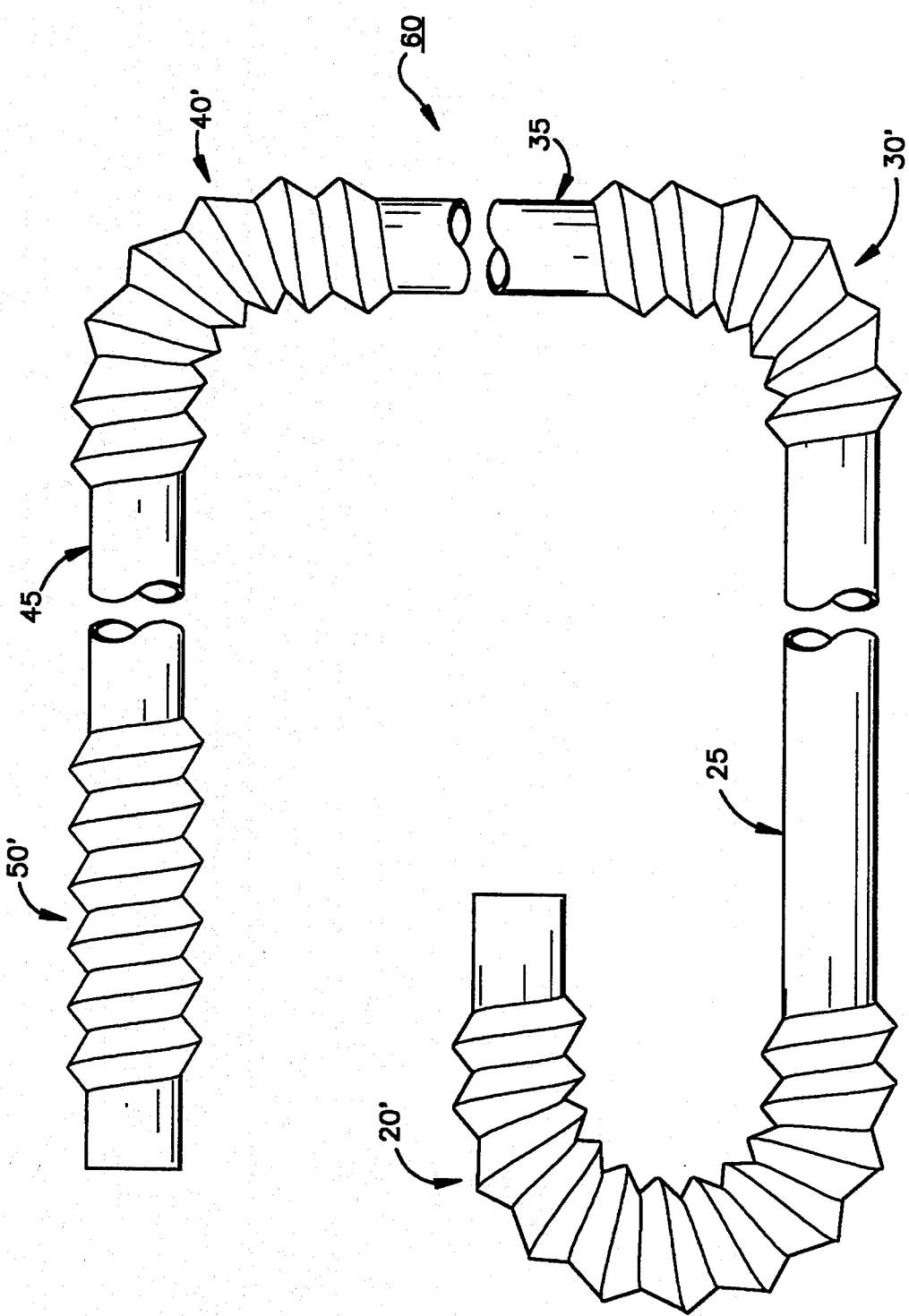

RUBBER TUBING WITH AXIALLY SPACED ANNULARLY CORRUGATED FLEXIBLE SEGMENTS

BACKGROUND OF THE INVENTION

This invention relates to the manufacture of flexible rubber tubing with annular or helical corrugations. More particularly, the invention relates to an unique variation of the method and apparatus for the manufacture of such tubing in accordance with U.S. Pat. Nos. 3,168,604; 3,304,581; 3,669,586; 3,705,780; 3,975,129; 4,053,275; 4,113,828; 4,308,228; and/or 4,360,493, and especially to a method and apparatus that produces tubing with a plurality of axially spaced corrugated length portions. For the purpose of this specification, the expression "circumferential" with respect to convolutions and corrugations will be used to include both annular and helical convolutions and/or corrugations.

As disclosed in the above patents which are incorporated by reference herein, corrugated tubing with annular or helical corrugations may be made with external forming devices including axially spaced annular disks or helices that are employed with forming mandrels and air pressure systems to produce embryonic corrugations in uncured rubber sleeves. Each time a tube is formed, the external forming device is placed over a forming mandrel (coated with a lubricant such as a silicone composition) on which a sleeve of uncured rubber has been positioned and the sleeve is radially expanded so that it bulges into the spaces between the disks or turns of the helices to form creases between the bulges.

According to the aforesaid patents, the external forming member and sleeve are then collapsed axially so that the sleeve is axially compressed, concertina fashion. The creases, together with adjacent bulges provide embryonic corrugations.

Then the forming member is axially extended together with the sleeve so that the sleeve may be removed from the forming mandrel and from within the forming member. The uncured rubber sleeve is then placed on a cylindrical curing mandrel where it is axially foreshortened, concertina fashion into a corrugated form with a desired spacing between adjacent annular or helical corrugations. The curing mandrel with the sleeve on it is then placed in an oven to cure the sleeve and set the corrugations.

The method and apparatus thus described have been used to produce flexible tubing of both circular and non-circular cross-sectional form with either annular or helical corrugations. Such tubing is used to great advantage in many and various applications.

In some applications, it may be desired to have a length of tubing that includes uncorrugated axial length portions, as well as a plurality of corrugated length portions spaced apart from one another by the uncorrugated length portions. With this arrangement, corrugated portions may be located where angular bends are to be formed in the conduit provided by the tubing. The corrugations are not required in linearly extending portions of the conduit.

In the past, tubing having these axially spaced corrugated length portions has been made by using multiple forming devices positioned during manufacture at axially spaced length portions of the uncured rubber sleeve where corrugations are desired. This can be a complicated process and can require several workers in order to position and manipulate the forming devices and to axially compress and expand the forming members during the forming of the embryonic corrugations.

The method of the present invention, however, resolves the difficulties indicated above and affords other features and advantages heretofore not obtainable.

SUMMARY OF THE INVENTION

The process of the invention provides an improvement over the methods disclosed in the prior art patents listed above that enables rubber tubing to be made with a plurality of axially spaced circumferentially corrugated flexible segments from a sleeve of uncured rubber without the use of multiple forming members. The process includes the steps of:

1. Positioning an end length of a sleeve of uncured rubber over an end portion of a forming mandrel;
2. Positioning about said end length, an axially extensible resilient forming member with axially spaced sleeve engaging convolutions;
3. Expanding said end length of said sleeve radially into engagement with said convolutions;
4. Axially foreshortening said forming member and said radially expanded end length of said sleeve, concertina fashion to cause circumferential portions of said sleeve to be pressed between convolutions of the forming member to form at least rudimentary corrugations in the end length;
5. Axially extending the forming member and the end length of said sleeve while radially collapsing the end length;
6. Moving said sleeve axially along said mandrel to a new axial location;
7. Moving the forming member axially relative to the sleeve to a new length portion of said sleeve axially spaced from the formed end length;
8. Repeating steps 3-6 until a desired number of length portions with rudimentary corrugations are formed;
9. Removing the forming member from the sleeve; and
10. Curing the sleeve to provide a length of rubber tubing with a plurality of axially spaced circumferentially corrugated flexible segments.

BRIEF DESCRIPTION OF THE DRAWINGS

FIGS. 1-9 are sequential, broken, elevational views illustrating the method of the invention and the product resulting therefrom;

FIG. 10 is a broken elevational view of a length of rubber tubing with a plurality of axially spaced circumferentially corrugated segments separated from one another by linear length portions of cylindrical tubular form, embodying the invention.

DESCRIPTION OF THE PREFERRED EMBODIMENT

Figure 7:
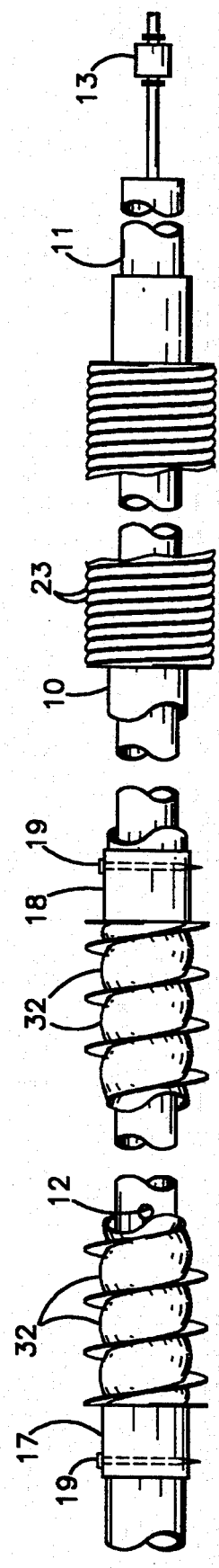

Referring more particularly to the drawings and initially to FIGS. 1-9, there is shown an apparatus for use in making, from an extruded sleeve 10 of uncured rubber, a length 60 of flexible tubing with a plurality of axially spaced circumferentially corrugated flexible segments. The extruded sleeve 10 is of the desired size for forming the particular product to be manufactured and is initially placed on the left hand end of a forming mandrel 11 that is connected at the other end to a pressure supply means (not shown). The mandrel is supported in cantilever fashion from the same end by a suitable support (not shown).

The mandrel 11 is initially coated with a lubricant such as a silicone composition which may be applied to the exterior of the mandrel by the sleeve, both the interior and exterior surfaces of which may be lubricated by emersing the sleeve in a bath containing the desired lubricant. The mandrel 11 has a plurality of radial ports 12 formed therein along a discrete axial length portion thereof at the left hand end as viewed in FIGS. 1–9. Also an end plug 13 is positioned at the opposite end (FIGS. 1–3).

Initially, an end length portion of the sleeve 10 is disposed on the mandrel 11 and an external form 15 is positioned over the mandrel and sleeve in the manner illustrated in FIG. 2. The external form 15 is used to provide the desired preliminary shaping of the sleeve, i.e. to form embryonic corrugations therein as accomplished in a manner similar to the general method of U.S. Pat. Nos. 3,168,604; 3,304,581; 3,669,586; 3,705,780; 3,975,129; 4,053,275; 4,113,828; 4,308,228; and/or 4,360,493.

The external form 15 may be of several different types, some of which are disclosed in the patents listed above, however, for the purpose of illustration, the form 15 is a helical device which produces helical corrugations in the finished product. The form 15 comprises spring metal, preferably a single strip of thin high tensile strength flat steel ribbon bent in its plane to a helical shape with adjacent convolutions laid against one another and of the same diameter. The wide dimension of the strip is thus disposed in radial relation to the longitudinal axis of the helical-spring form or helix with the edge of the strip normal to the axis.

In its natural shape, the form 15 is axially collapsed with adjacent convolutions closely spaced, preferably disposed flatwise against one another in contacting relation. The form has helical inner edges 16 which engage the uncured rubber sleeve 10 and serve to determine the shape of the resulting tubular rubber product.

The ends of the helical strip are provided with cylindrical sleeves 17 and 18 that aid the worker in the manipulation of the device during the forming process. Metal pins 19 may be inserted through radial, diametrically aligned holes in the sleeves and through registering holes provided in the mandrel 11 to hold the form in its extended position as desired.

The method of the invention will be understood with reference to the sequential steps illustrated in FIGS. 1–9. FIG. 1 shows the mandrel 11 with the forming device 15 positioned thereon and axially expanded to provide the desired initial configuration. However, normally the forming device 15 would not be placed on the mandrel until after the uncured rubber sleeve 10 has been slid into position.

To begin the process, the lubricant coated sleeve 10 is slid over the left hand end of the mandrel 11 for a predetermined distance. The respective length portion of the mandrel is approximately equal to the expanded length of the form 15 as illustrated in FIG. 1. Once the end of the uncured rubber sleeve is in the desired position, the external form 15 is positioned over the mandrel and sleeve in the manner indicated in FIG. 2.

As illustrated, the external form is axially extended and held in place using the pins 19. The external form 15 is used to provide the desired preliminary shaping of the sleeve 10, i.e. to form embryonic corrugations therein.

At this point, air under pressure is supplied through the forming mandrel 11 at the right hand end and the air flows through the radial ports 12 to the space between the sleeve 10 and the outer surface of the mandrel 11. Normally, an operator presses the ends of the sleeve 10 against the mandrel to seal the ends of the sleeve portion and prevent or at least restrict the escape of air. The fluid pressure inflates the sleeve 10 and annular bulges 22 are formed in the spaces between the grooves 16 as illustrated in FIG. 3.

With the assembly in this condition, the air supply is cut off and the external form in most instances, is axially compressed concertina fashion as illustrated in FIG. 4 so that the annular bulges 22 extend between adjacent grooves resulting in increasing the radial dimensions and reducing the axial dimensions of the bulges 22 in the length portion 20 of the uncured rubber sleeve 10. As indicated in FIG. 4, there are annular ridges 23 at the peaks of the bulges and rounded annular creases 24 between the bulges.

After this step is accomplished, the external form 15 and sleeve 10 are axially elongated as necessary (FIG. 5) and the external form is slid away from the portion 20 of the sleeve with the embryonic corrugations. The extension of the sleeve 10 reduces the diameter of the bulges 22 sufficiently to permit the external form to be moved axially away from the portion 20 with the rudimentary corrugations.

At this point, in accordance with the invention, the uncured rubber sleeve 10 is moved axially to the right along the mandrel to the position illustrated in FIG. 6, for example. The adjacent length portion of the sleeve to the left is selected so as to provide an uncorrugated tubular length 25 in the sleeve between the first corrugated portion 20 and a second corrugated portion 30 to be formed next by the external form 15.

Figure 8:
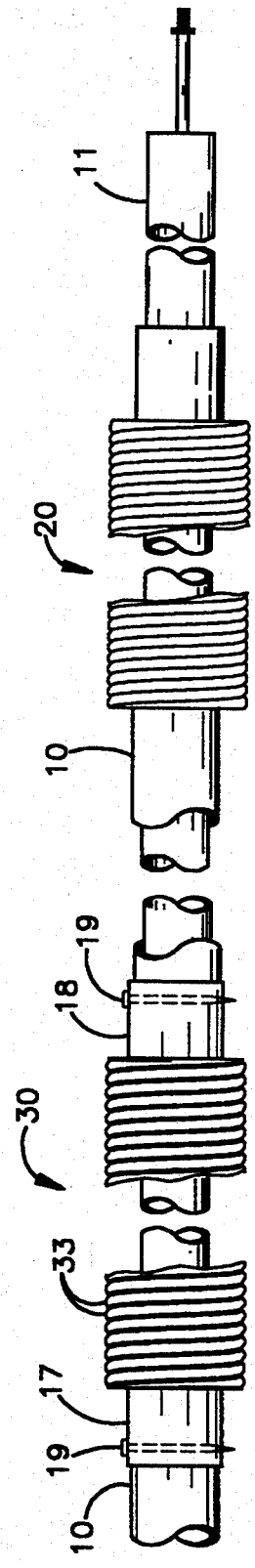
Figure 9:
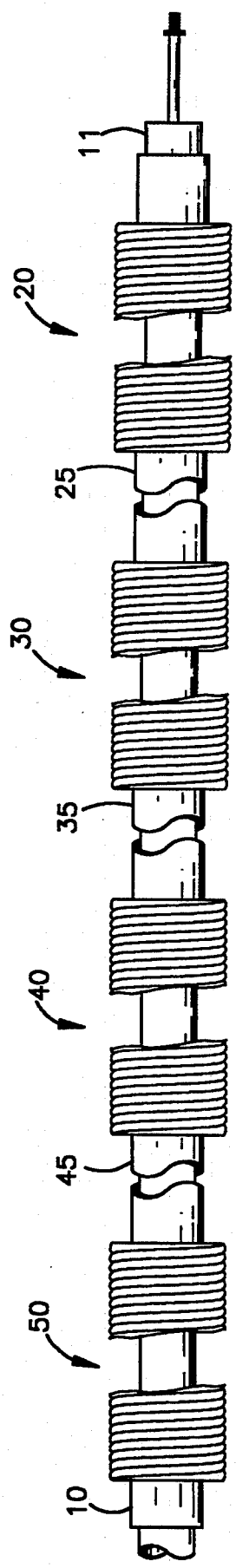

With the uncured rubber sleeve 10 in this new position, the portion 20 of the sleeve with the rudimentary corrugations may be axially compressed to save space along the axial length of the mandrel. Then the forming process described above is repeated as indicated in FIG. 7 with respect to the new length portion of the sleeve that is surrounded by the external form 15. FIG. 8 illustrates the completion of the forming of the rudimentary corrugations in the next portion 30.

These forming steps are continued until a desired number of length portions with rudimentary corrugations have been formed. At the same time, tubular length portions such as the length portions 25, 35 and 45 (FIG. 9) are located between the adjacent portions 20, 30, 40, and 50 with rudimentary corrugations.

Once the forming of rudimentary corrugations has been completed, the resulting product may be cured to set the corrugations and produce the tubular product 60 illustrated in FIG. 10. To accomplish the curing, the mandrel 11 itself may be used to support the uncured rubber sleeve or the sleeve with the rudimentary corrugations may be removed from the forming mandrel 11 and placed on a curing mandrel or pole for the curing operation.

While the invention has been illustrated in connection with the forming of helical corrugations in a length of flexible rubber tubing, it will be understood that similar techniques may be used to form annular corrugations and in some instances, corrugated tubing of non-circular cross-section such as oval, rectangular etc.

While the invention has been shown and described with respect to specific embodiments thereof, this is intended for the purpose of illustration rather than limitation and other variations and modifications of the specific method and product herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

I claim:

1. The process of making a length of rubber tubing with axially spaced circumferentially corrugated flexible segments from a sleeve of uncured rubber including the steps of:
   1. positioning an end length of said sleeve over an end portion of a forming mandrel;
   2. positioning about said end length, an axially extensible, resilient forming member with sleeve-engaging convolutions so that there is space between the convolutions;
   3. expanding said end length of said sleeve radially into engagement with said convolutions;
   4. axially foreshortening said forming member and said radially expanded end length of said sleeve concertina fashion to cause circumferential portions of said sleeve to be pressed between convolutions of said forming member, to form at least rudimentary corrugations in said end length;
   5. axially extending said forming member and said end length of said sleeve while radially collapsing said end length;
   6. moving said sleeve axially along said mandrel to a new axial location;
   7. moving said forming member axially relative to said sleeve to a new length portion of said sleeve axially spaced from said end length;
   8. repeating steps 3 through 6 until a desired number of length portions with rudimentary corrugations are formed;
   9. removing said forming member from said sleeve; and
   10. curing said sleeve to provide a length of rubber tubing with axially spaced circumferentially corrugated flexible segments.

2. A process as defined in claim 1 wherein said forming member has helical sleeve-engaging convolutions.

3. A process as defined in claim 1 wherein said forming member has annular sleeve-engaging convolutions.

* * * * *